United States Patent [19]

Fujiwara

[11] 4,146,956
[45] Apr. 3, 1979

[54] METHOD FOR MANUFACTURING A MULTIPOLAR ERASING HEAD

[75] Inventor: Tatsuo Fujiwara, Yokohama, Japan

[73] Assignee: Tokyo Shibaura Electric Co., Ltd., Kawasaki, Japan

[21] Appl. No.: 831,253

[22] Filed: Sep. 7, 1977

[30] Foreign Application Priority Data

Apr. 9, 1976 [JP] Japan ............................... 51-39394
Nov. 16, 1976 [JP] Japan ............................. 51-136888
Nov. 16, 1976 [JP] Japan ............................. 51-136889
Jan. 12, 1977 [JP] Japan ................................ 52-1453

[51] Int. Cl.² ............................................. G11B 5/42
[52] U.S. Cl. ..................................... 29/603; 29/593; 29/737; 360/118; 361/143
[58] Field of Search ........................... 29/603; 360/118; 361/143, 148; 335/284

[56] References Cited

U.S. PATENT DOCUMENTS 3,858,136 12/1974 Jun ........................................ 335/284
3,961,374 6/1976 Murata et al. ......................... 360/118

FOREIGN PATENT DOCUMENTS 40-1551 1/1965 Japan.
51-72317 6/1976 Japan.

Primary Examiner—Carl E. Hall
Attorney, Agent, or Firm—Oblon, Fisher, Spivak, McClelland & Maier

[57] ABSTRACT

Alternate S- and N-poles are disposed on a multipolar erasing head in the direction of a relative movement of the multipolar erasing head to a magnetic recording medium. The multipolar erasing head includes at least one region where the distances between adjacent magnetic poles of the same polarity are successively shortened in the direction for successively erasing the information recorded on the recording medium. A method and apparatus for manufacturing such an erasing head are also disclosed.

9 Claims, 16 Drawing Figures

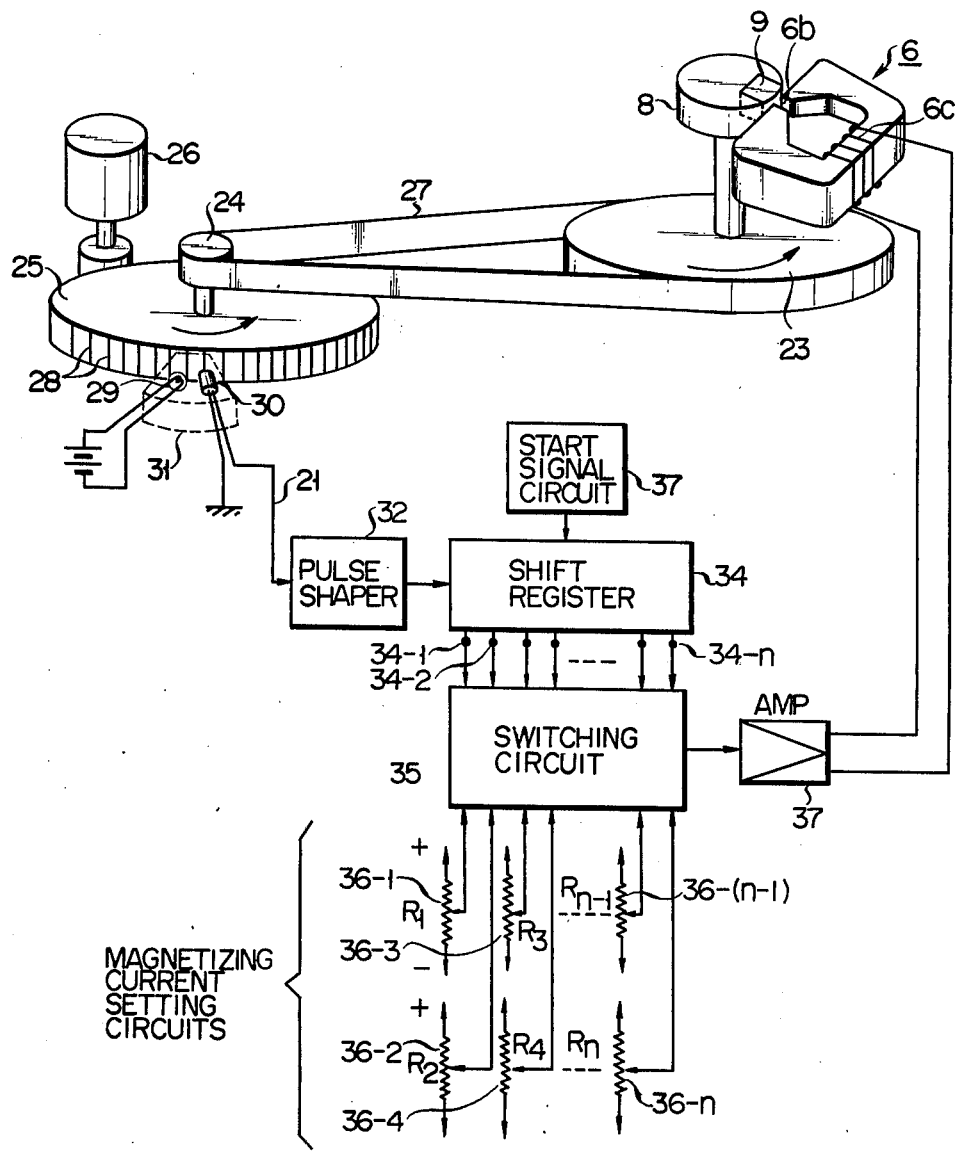

METHOD FOR MANUFACTURING A MULTIPOLAR ERASING HEAD

The present invention relates to an erasing head for erasing the information recorded on a magnetic recording medium and, more particularly, to a multipolar erasing head of a permanent magnet with alternate S- and N-poles disposed thereon and a method and an apparatus for manufacturing the erasing head.

The erasing method for erasing the information recorded on a magnetic recording medium such as a magnetic tape is generally classified into a magnetic saturation erasing method and a return-to-zero erasing method. The magnetic saturation erasing method is to magnetically saturate the magnetic tape by feeding DC current to the exciting winding of the magnetic head or by contacting the erasing head of permanent magnet with the magnetic tape. In the return-to-zero erasing method, high frequency current is fed to the exciting winding of the erasing head and the residual magnetic flux of the magnetic tape is reduced to zero by a gradually reducing alternate magnetic field developed when the magnetic tape passes the gap of the magnetic head. Generally, the return-to-zero erasing method is advantageous over the magnetic saturation erasing method in that, when the information newly recorded on the erased magnetic tape is reproduced, the reproduced signal is accompanied by a little amount of noise and distortion. However, use of the erasing driven by high frequency current needs relatively large high frequency oscillator. Particularly, in the tape-recorder with a radio built-in, the high frequency signal from the high grequency oscillator possibly produces beats. Contradictively, use of the erasing head driven by permanent magnet eliminates the just-mentioned disadvantages, since no high frequency oscillator is needed.

A conventional permanent magnet type erasing head has alternate S- and N-magnetic poles on the surface. The magnetic field intensity over the surface is so distributed that it successively reduces in the magnetic tape travelling direction. The magnetic tape travels over the erasing head with such a distribution of the magnetic field intensity, resulting in erasing of the information on the magnetic tape.

An exemplary of the method for manufacturing the conventional erasing head is illustrated in FIG. 1. As shown, the magnetic pole surface of a head member 1 to be magnetized is disposed slightly spaced from magnetic poles S, N, S and N alternately disposed of a comb shaped electromagnet 2. The electromagnet 2 is provided with windings 3, 4 and 5 to which exciting currents are fed with such the polarities to give polarities as shown at the respective top ends of comb teeth. Accordingly, the magnetic poles with the polarities as shown are formed on the magnetizing surface of the head member 1. The successive reduction of the magnetic field intensity on the head surface in the tape travelling direction is realized by successively decreasing the magnetizing current fed to the exciting windings 3, 4 and 5 or by gradually decreasing number of turns of the same windings and feeding magnetizing current with equal amplitudes.

In the above-mentioned magnetizing method, since the electromagnetic 2 is magnetically saturated, it is difficult to miniaturize the electromagnet 2. The size of the head member 1 also is sometimes restricted by the construction of the tape-recorder into which the head member 1 is incorporated. For this, increase of number of magnetic poles is prevented. For example, only four to five magnetic poles are the number of the magnetic poles formed on the head member of 5 mm surface length. When the information recorded on a tape is erased by scanning by means of an erasing head having such small number of magnetic poles and other information is newly recorded on the erased tape, the amount of noise and distortion factor of the reproduced signal of the newly recorded information is considerably great, compared to the case using the return-to-zero erasing head using high frequency current.

The inventor of the present application discovered a novel magnetizing method capable of forming the magnetic poles at high density on a head member and improving the erasing characteristic. The improvement of the erasing characteristic results from the successive shortening of the distances between adjacent magnetic poles of the same polarity in a pregiven direction.

Accordingly, an object of the present invention is to provide a permanent magnet type erasing head having a region where the magnetic poles are formed at high density and the distances between adjacent magnetic poles of the same polarity are successively shortened in a pregiven direction.

Another object of the present invention is to provide a method for manufacturing a multipolar erasing head having a region where the magnetic poles are formed at high density and the distances between adjacent poles of the same polarity are successively shortened in a pregiven direction.

Still another object of the present invention is to provide an apparatus for manufacturing a multipolar erasing head having a region where the magnetic poles are formed at high density and the distance between adjacent poles of the same polarity are successively shortened in a pregiven direction.

According to one form of the present invention, there is provided a multipolar erasing head movable relative to a magnetic recording medium and with alternate S- and N-magnetic poles in the section between both ends of the erasing head in the direction of the relative movement. The multipolar erasing head includes at least one region where the distances between adjacent magnetic poles of the same polarity are successively shortened in a pregiven direction.

According to another form of the present invention, there is provided a manufacturing method for manufacturing a multipolar erasing head comprising steps: moving a multipolar erasing head member of which the surface to be magnetized is disposed in contact with or slightly spaced from an electromagnet with a gap, relative to the electromagnet in a manner that the erasing head surface passes the gap; supplying to an exciting winding of the electromagnet pulse currents of which the polarities are periodically reversed during the movement; and controlling the speed of the relative movement of the erasing head member or the period of the polarity reversing of the pulse current so as to successively change in a given direction the distances between adjacent magnetic poles of the same polarity formed on the surface of the erasing head member.

According to another form of the present invention, there is provided a manufacturing method of a multipolar erasing head comprising the steps of: moving a multipolar erasing head member of which the surfaces to be magnetized is disposed in contact with or slightly spaced from an electromagnet with a gap, relative to the electromagnet in a manner that the erasing head surface passes the gap; detecting the time that a specified position to be magnetized on the surface of the erasing head member passes the gap during the relative movement and producing a control signal in synchronism with the time; and supplying to an exciting winding wound around the electromagnet pulse current with polarities and amplitudes corresponding to the controlling signal, the pulse current being supplied from a magnetizing current supply circuit in response to the control signal applied thereto.

According to a further form of the present invention, there is provided an apparatus for manufacturing a multipolar erasing head comprising: a holding member for holding a multipolar erasing head member to be magnetized; an electromagnet having a gap and an exciting winding; means for driving either of the holding member or the electromagnet in order that the magnetizing surface of the erasing head passes the gap of the electromagnet through a relative movement; magnetizing-position detecting means for detecting the time that a position to be magnetized on the erasing head member passes the gap and producing control signals in synchronism with the time; and a magnetizing current supply circuit for supplying pulse current with polarities and magnitudes corresponding to the control signals fed from the magnetizing-position detecting means.

Other objects and features of the invention will be apparent from the following description taken in connection with the accompanying drawings, in which.

Figure 7:
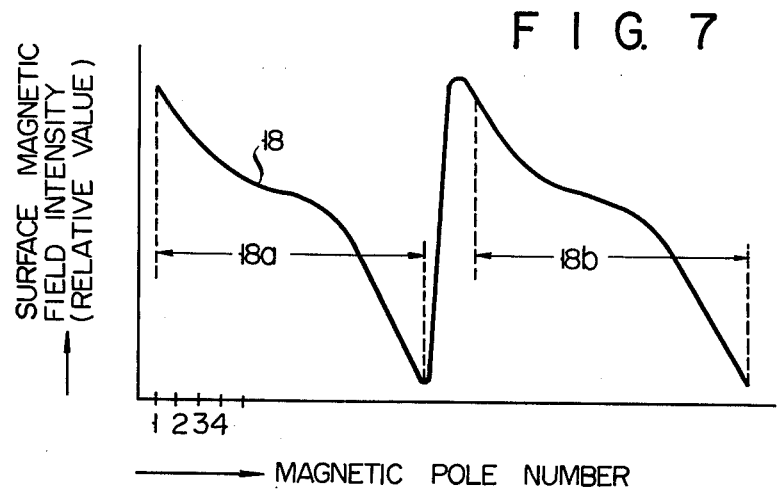
Figure 8:
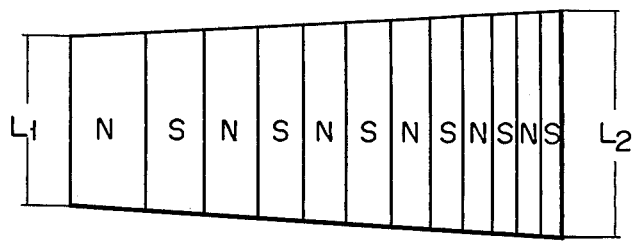
Figure 9:
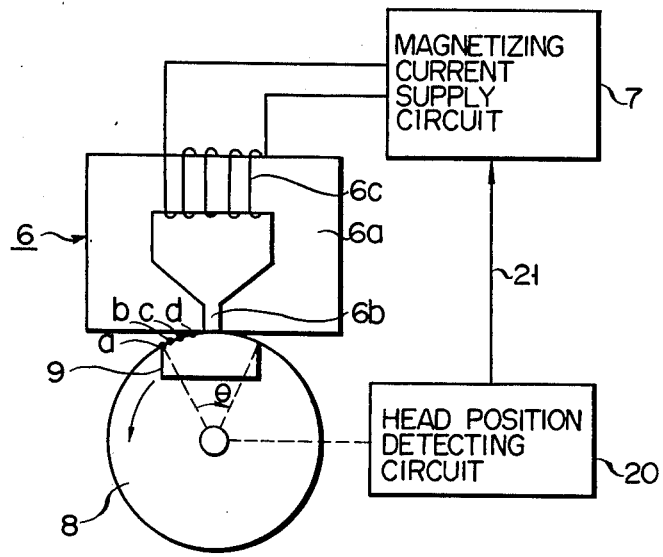
Figure 10:
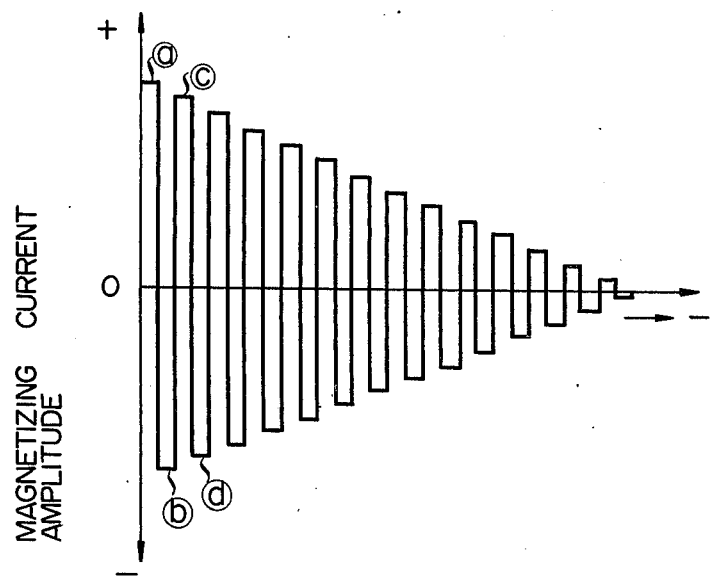
Figure 12:
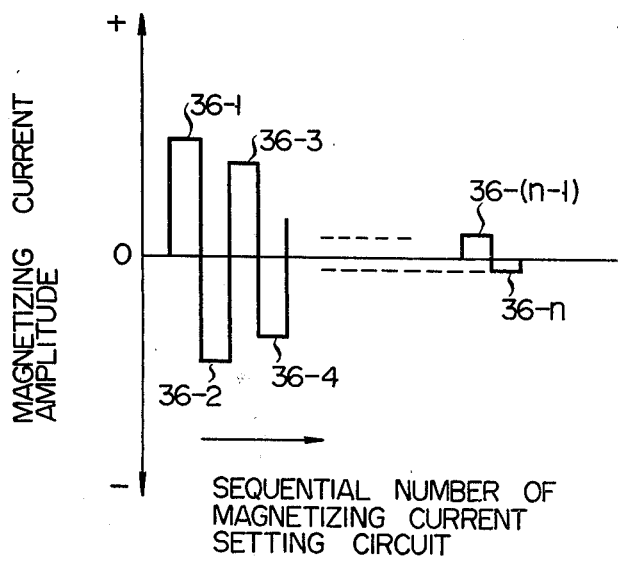
Figure 13:
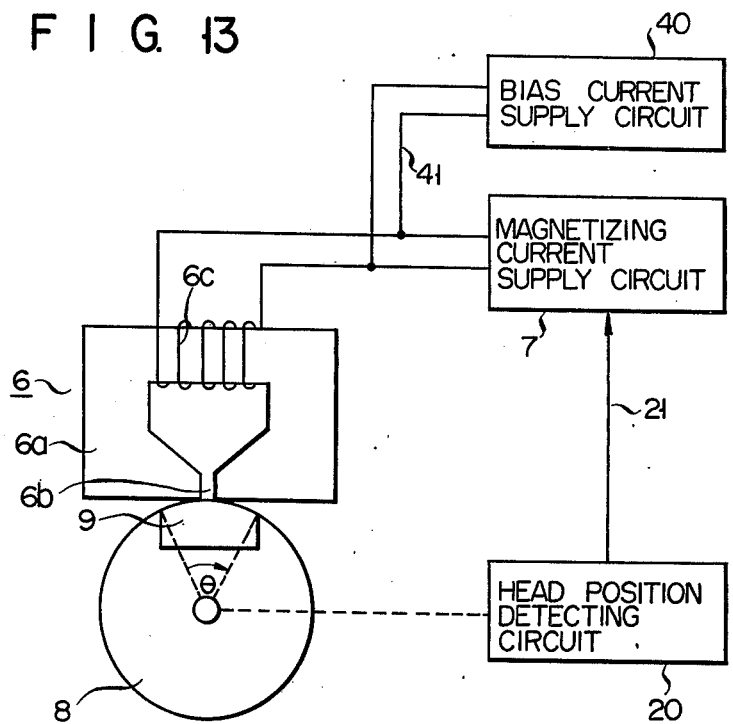
Figure 14:
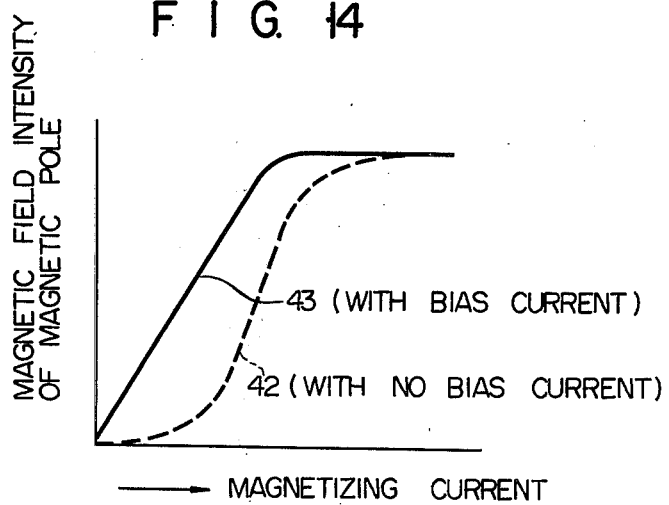

FIG. 7 also illustrates the relation between the surface magnetic field intensity and the magnetic poles serially arranged of a fourth embodiment of the multipolar erasing head according to the present invention;

FIG. 8 shows a plan view of a fifth embodiment of a multipolar erasing head according to the present invention;

FIG. 9 shows a schematic illustration of the second embodiment of a multipolar erasing head manufacturing apparatus according to the present invention;

FIG. 10 shows one form of the magnetizing current waveforms supplied from the magnetizing current supply circuit shown in FIG. 9;

FIG. 11 shows a third embodiment of the multipolar erasing head manufacturing apparatus according to the present invention;

FIG. 12 illustrates one form of the magnetic current waveforms produced by the FIG. 11 apparatus;

FIG. 13 schematically illustrates a fourth embodiment of the multipolar erasing head manufacturing apparatus according to the present invention; and FIG. 14 illustrates in graphical form the relationship of the magnetic field intensity of magnetic pole magnetized to the magnetizing current for magnetizing the erasing head member.

Figure 2:
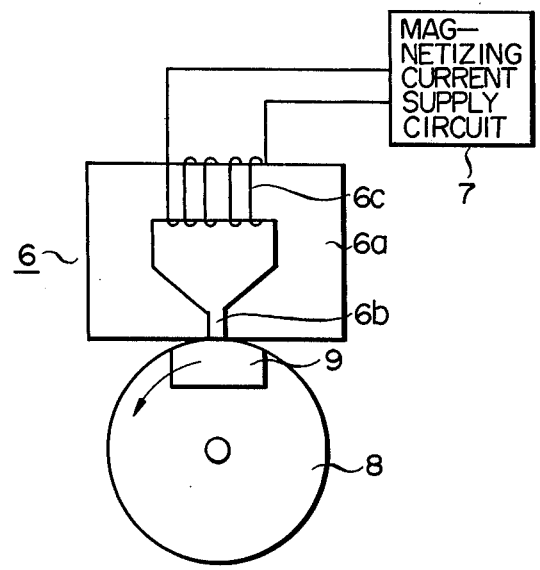
FIG. 2 shows a schematic illustration of a first emodiment of an apparatus for manufacturing a multipolar erasing head according to the present invention.

Referring now to FIG. 2, there is shown a first emodiment of a multipolar erasing head according to the present invention. An electromagnet generally designated by the reference numeral 6 includes a magnetic core 6a, a gap 6b, and an exciting winding 6c. A magnetizing current supply circuit 7 supplies AC current to the exciting winding 6c. Pulse current of which the polarities are periodically reversed is preferable for the AC current. The core 6a is preferably made of material saturable with high magnetic density such as, for example, pure iron, silicone steel, or permalloy. An erasing head member 9 is removably held by a rotatable member which is rotated by a drive means (not shown). The erasing head member 9 rotates passing the gap 6b in a direction of arrow. The head member 9 may be designed such that it rotates contacting the core 6a or being slightly spaced therefrom. There is a case where the rotational speed of the holding member 8 is pregiven. In such a case, if a signal representing the start of the member 8 rotation is supplied to the magnetizing current supply circuit (although not shown), synchronism may be established between the time that a specified point (to be magnetized) on the head member surface passes the gap 6b and the time that the magnetizing current is supplied. If the magnetizing pulse current with alternately reversing polarities is applied to the exciting winding 6c under such the synchronization, alternate S- and N-magnetic poles are formed on the surface of the erasing head member 9. Realization of the successive reduction of the distances between adjacent magnetic poles of the same polarity (hereinafter referred often to as adjacent poles distances) necessitates, for example, the following control during the period that the erasing head member 9 starts and finishes passing the gap 6b. Firstly, when the rotational speed of the holding member 8 is constant, the period of the polarity inversion of the magnetizing pulse current is successively shortened during the moving of the erasing head member 9. Secondly, when the polarity inversion period is constant, the rotational speed of the erasing head member 9 is gradually decelerated during the moving. In this case, a constant reduction rate of the rotational speed employed provides the corresponding constant reduction rate of the distances between adjacent poles of the same polarity. The rate of the successive deceleration of the rotational speed when a predetermined region of the erasing head member 9 passes the gap 6b may be smaller than that when the remaining region thereof passes the gap 6b. As a matter of course, this case is that the shortening rate of the adjacent poles distances of the predetermined region is smaller than that of the remaining one. Another method is possible in which the adjacent poles distances are successively reduced on a plurality of regions of the erasing head member 9 and the arrangement of the adjacent poles distances is analogous among them. In this method, a similar change of the rotational speed of the head member is repeated when the head member 9 passes the gap 6b. The amplitude of the magnetizing pulse current is preferably controlled so that it becomes smaller as the adjacent poles distance becomes shorter.

Figure 3:
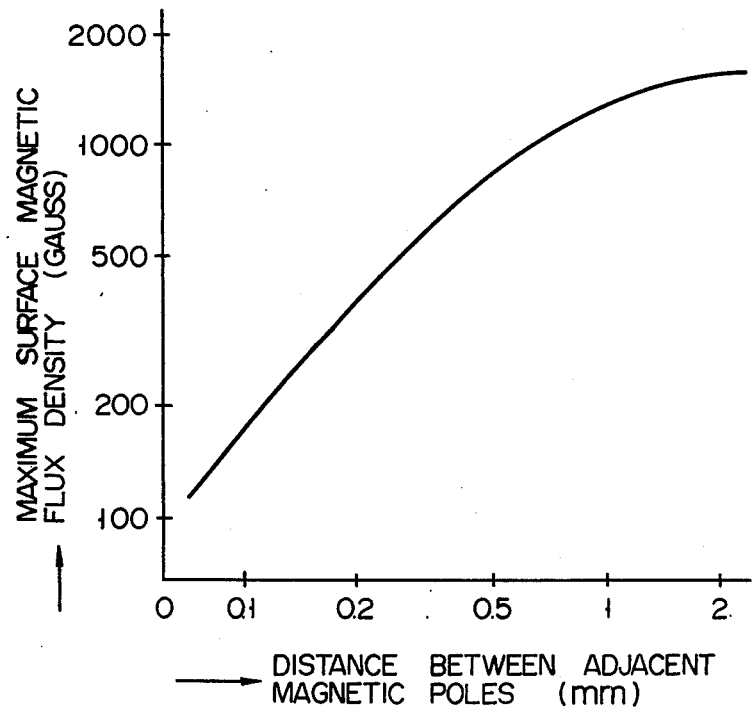
FIG. 3 is a graph for illustrating the relation of the maximum surface magnetic flux density versus the distance between adjacent magnetic poles of the same polarity of the multipolar erasing head according to the present invention.

The erasing head member was magnetized by varying the adjacent poles distances as mentioned above, by means of the apparatus shown in FIG. 2. The result of the magnetization is shown in terms of the relation between the adjacent poles distance and the maximum surface magnetic flux density corresponding thereto, which the relation is depicted by a curve 10 in FIG. 3. As seen from the curve 10, the magnetic flux density of the erasing head becomes smaller as the adjacent poles distance becomes shorter. This means that the adjacent poles distance may be shorter for the region permitting a small flux density. This also indicates that, when the head member with a predetermined length of the surface is magnetized with the arrangement of the successive shortening of the adjacent poles distances, a number of magnetic poles may be formed thereon and the erasing characteristic for erasing the recorded information on a magnetic tape is improved. In other words, this remarkably reduces an amount of noise generated in the reproduction and the distortion factor of the reproduction signal.

Figure 1:
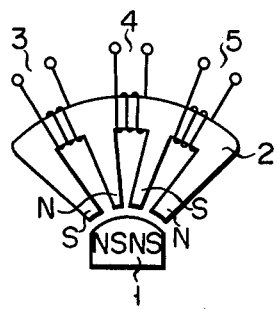
FIG. 1 shows a schematic illustration of a manufacturing method of a conventional multipolar erasing head.
Figure 4A:
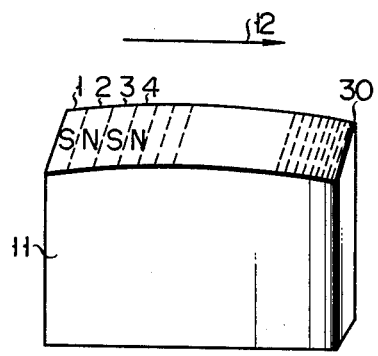
FIG. 4A shows a perspective view of a first embodiment of the multipolar erasing head of the present invention.
Figure 4B:
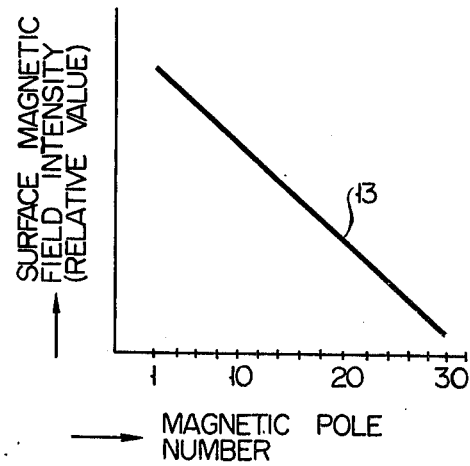
FIG. 4B shows a graph illustrating the relation of the surface magnetic field intensity versus the magnetic pole number of the multipolar erasing head shown in FIG. 4A.

A first embodiment of a multipolar erasing head of the present invention is perspectively shown in FIG. 4A. As shown, 30 magnetic poles No. 1 to No. 30 are formed on the surface of an erasing head 11. S- and N-poles are alternately and serially arranged thereon and the adjacent poles distances are successively shortened along in the travelling direction 12 of the magnetic tape. The shortening rate of the adjacent poles distances is constant over the erasing head 11. The surface magnetic field intensity (relative value) is related substantially linearly to the magnetic poles sequentially arranged, as shown in FIG. 4B. The conventional magnetizing method as shown in FIG. 1 can form only six magnetic poles on the erasing head member with the 6 mm magnetizing surface. According to the method of the present invention, 30 magnetic poles may easily be formed thereon and, if necessary, 60 magnetic poles forming is possible.

Figure 5A:
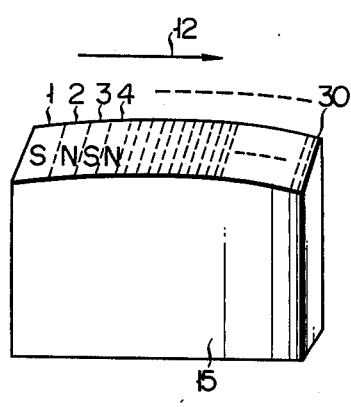
FIG. 5A shows a perspective view of a second embodiment of the multipolar erasing head of the present invention.
Figure 5B:
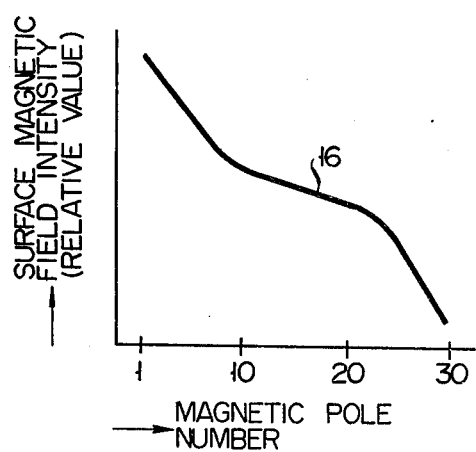
FIG. 5B illustrates the relation of the surface magnetic field intensity versus the magnetic poles serially arranged of the multipolar erasing head shown in FIG. 5A.

A perspective view shown in FIG. 5A illustrates a second embodiment of the multipolar erasing head of the present invention. 30 magnetic poles are formed on the erasing head surface, like the FIG. 4A embodiment. All of the adjacent poles distances are successively shortened along in the travelling direction 12 of the tape. This also is the same as of the previous case of FIG. 4A. The difference is that the shortening rate of the adjacent poles distances ranging approximately from No. 11 to No. 22 is smaller than that of the other magnetic poles. That is, as shown in FIG. 5B, the reduction rate of the surface magnetic field density corresponding to the magnetic poles No. 11 to No. 22 distributed substantially at the central portion on the surface of the erasing head member is smaller than that corresponding to the magnetic poles of other numbers. Such the erasing head further improves the erasing characteristic.

A great number of magnetic particles are coated on the magnetic tape and the coercive forces of the particles are not uniform. The magnetic fields developed the respective magnetic particles mutually interfere additionally to make the coercive forces thereof irregular. Therefore, irregular magnetic fields are necessary to make these magnetic particles inverse in the polarities. The coercive force of the magnetic tape is now assumed to be the average of the coercive forces of all of the magnetic particles. The variation of the coercive forces of the particles distributes in the range from $\frac{1}{3}$ to 3 times of the coercive force of the magnetic tape. Accordingly, to erase the information on the magnetic tape, the erasing magnetic field 3 to 4 times the coercive force of the magnetic tape must be applied onto the magnetic tape, and then it must be gradually weakened to $\frac{1}{3}$ to 1/5 times while the polarity of the erasing magnetic field is reversed little by little. The variation distribution of the coercive magnetic forces of the magnetic particles shows that major is the magnetic particles with the coercive magnetic forces approximate to the magnetic tape coercive force and minor is the magnetic particles of which the coercive force are below and above an approximation of the coercive force of the magnetic tape. Therefore, in order to fully erase the information on the magnetic tape, desirable is that number of magnetic poles developing the erasing magnetic field corresponding to the magnetic coercive force of the magnetic tape is larger than that of the poles for developing the erasing magnetic field above and below that of the magnetic tape. Further, advisable is that the reduction rate of the pole distances in the region where the magnetic field $\frac{1}{2}$ to 2 times the coercive force of the magnetic tape is generated and the desired magnetic field is developed is smaller than that of the pole distances in other regions, as shown in FIG. 5A and 5B. In other words, greater number of magnetic poles may be formed on the erasing head member with a fixed length of the surface, if the shortening rate of the adjacent poles distances in the central region of the head surface is smaller than that of those in both side regions. This is the reason why the erasing characteristic of the erasing head is further improved if the erasing head of FIG. 5A is used.

Figure 6:
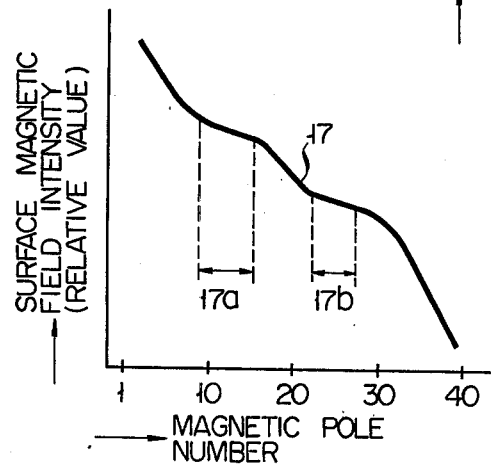
FIG. 6 illustrates the relation between the surface magnetic field intensity and the magnetic poles serially arranged of a third embodiment of the multipolar erasing head according to the present invention.

A third embodiment of the multipolar erasing head according to the present invention exhibits a characteristic curve of the surface magnetic field intensity versus magnetic poles as shown in FIG. 6 and denoted as 17. As seen from the characteristic curve, the rates of the successive shortening of the adjacent poles distances in two regions 17a and 17b are smaller than those of them in other regions. In present audio tape-recorders, mainly used tapes are the magnetic tape of 280 oersted coercive force and the one of 550 oersted. It is desirable, therefore, that the surface magnetic field distribution is shaped as shown in FIG. 6: the region 17a is effective for information-erasing of a magnetic tape having a coercive force of 350 oersted; the region 17b for information-erasing of a magnetic tape having a coercive force of 280 oersted. Thus, this embodiment further expands the application of the erasing magnetic head.

A surface magnetic field intensity distribution shown in FIG. 7 is that of the fourth embodiment of the multipolar erasing head according to the present invention. As seen from the surface magnetic field distribution curve designated by numeral 18 in the figure, the distributions of the surface magnetic field intensity in the regions 18a and 18b of the erasing head are analogous.

The same distribution of adjacent poles distances are made on the surface of a erasing head so as to produce the magnetic field intensity distribution of the curve 18. A comparative experiment was conducted for two magnetic tapes: one is the tape which is erased one time by using the multipolar erasing head of the invention; the other is the one erased two or three times by the same. New information is recorded on the respective erased tapes and then reproduced. The amount of noise and the distortion factor of the reproduced signals were measured comparatively. The result of the measurement shows that the erasing characteristic of the tape erased two times is improved by several dB, compared to the tape erased one time. This experiment shows that two or more erasing operations made to the tape is desirable for ensuring good reproduction of signal. The fourth embodiment enables a single erasing head to execute such the repititive erasing operations. This is very effective and useful in such case and, as readily seen, follows the fact that the erasing head of the invention can be formed with a number of magnetic poles thereon.

FIG. 8 shows a fifth embodiment of the erasing head according to the present invention. As shown in the figure, as the adjacent poles distances are larger, the widths (the length of the magnetic pole normal to the travelling direction of the magnetic tape) of the magnetic poles shorten inversely. In the figure, the minimum width of the magnetic pole is denoted as $L_1$ and the maximum one thereof denoted as $L_2$. The reason why such a configuration of the erasing head surface is employed is that, when the adjacent poles distances are large, the magnetic field leaks greatly from both the sides of the magnetic pole, and therefore the area to be erased widens. If the erasing head surface is previously configured as shown in FIG. 8, the erasing head having the magnetic pole arrangement as shown in the figure is obtained which is capable of erasing a constant width on the magnetic tape. Therefore, use of the erasing head of the instant embodiment eliminates a disadvantageous case where, when multichanneled magnetic tape is erased, undesired adjacent channels are erroneously erased.

The first example of the erasing head manufacturing apparatus was already described referring to FIG. 2. The FIG. 2 manufacturing apparatus may be substituted by an apparatus shown in FIG. 9. In the figure, like reference numerals are used to designate like or equivalent portions in FIG. 2. A head position detecting circuit 20 is used to detect specified positions of the rotating erasing head. In other words, the circuit 20 detects the times when the specified positions a, b, c and d, for example, on the erasing head surface pass the gap 6b when the head member 9 rotates at an angle of $\theta$. The detector 20, when detecting them, delivers control signals 21 representing the positions a, b, c and d to the magnetizing current supplying circuit 7. Upon the receipt of the control signals 21, the circuit 7 delivers pulse currents with polarities and amplitudes reflecting the contents of the control signals 21 to the exciting winding 6c. Rectangular shaped pulses as shown in FIG. 10 may be employed for the output signal of the supply circuit 7. If the specified positions a, b, c and d are equally spaced and the rotational speed of the erasing head is constant, signals fed to the winding 6c are pulse currents, ⓐ, ⓑ, ⓒ and ⓓ with polarities and amplitudes, as shown in FIG. 10, corresponding to specified positions passing the gap 6b. In this manner, a plurality of magnetic poles are equally spaced on the head member 9, with the magnetic flux density thereon gradually reduced. When the intervals between adjacent specified positions on the head member 9 are successively shortened, the magnetic poles distances are gradually shortened. It is evident that the successive narrowing of the adjacent poles distances may be realized by making the rotational speed of the head member gradually slow. Any one of well known means may be employed for gradually reducing the amplitude of the exciting current. One of them is that an output transistor used in the magnetizing current supply circuit 7 is biased in accordance with the control signal 21. Another is that a variable resistor is connected in series with an output circuit of the supply circuit 7 and is operable interlocking with the holding member 8.

The description to follow is a fourth embodiment of the erasing head manufacturing apparatus according to the invention. Reference is made to FIG. 11. The holding member 8 holding the erasing head 9 is rotated in an arrow head direction by a pulley 23. The previously stated electromagnet 6 held by a suitable member (not shown) is disposed such that the rotating erasing head 9 passes the gap 6b of the electromagnet 6. Pulleys 24 and 25 are used, as shown in the figure. The pulley 25 directly rotates the pulley 24 while it is rotated by a motor 26 through a speed reduction means. The pulleys 23 and 24 are coupled by a belt 27 and, as seen from the figure, the rotational speed of the pulley 23 is further reduced. A scale 28 is provided on the peripheral surface of the pulley 25, and is detected by, for example, an optical means. The graduation of the scale 28 corresponds to the arrangement of the magnetic poles on the surface of the head member 9. The graduated spaces of the scale 28 correspond to those that the distances between adjacent magnetic poles of the same polarity are magnified according to the speed reduction rate of the rotating system. The detection of the scale 28 is made by a photo-coupler 31 including a light source 29 and a photoelectric converting element 30. Of course, a mechanical detecting means may also be employed in place of the optical detecting means. In this case, the scale 28 must be constructed so as to permit the mechanical detecting means to detect the graduations of the scale. The output signal 21 of the photo-coupler 31 is applied to a pulse shaping circuit 32 where the waveshape thereof is pulse-shaped. The pulse shaping circuit 32 is connected at the output to a shift-register 34. The shift-register 34 is provided with output terminals 34-1 to 34-n through which the signals transferred from the pulse-shaper 32 are successively taken out. The output signals thus taken out through the output terminals are then applied to one side of the inputs of a switching circuit 35. The other side of the outputs of the switching circuit are correspondingly connected to magnetizing current setting circuits 36-1 to 36-n. The magnetizing current setting circuits 34-1 to 34-n include variable resistors R1 to Rn, respectively. Each of these variable resistors is connected at one end to the positive side of a power source (not shown) and at the other end to the negative side thereof. The output taking-out point of each resistor is connected to the corresponding input terminal of the switching circuit 35. With such a circuit construction, when the photo-coupler 31 detects the first graduation of the scale 28, an output signal from the shift-register 34 through the first output terminal 34-1 thereof drives the switching circuit 35 which in turn permits a magnetizing current set by and fed from the magnetizing current setting circuit 36-1 to pass therethrough to a DC amplifier 37. Detection of the second graduation provides another output signal through the shift-register 34 and its second output terminal 34-2 to drive the switching circuit 35. Then, the switching circuit likewise permits the magnetizing current set by the circuit 36-2 to go to the DC amplifier 37. Similar operations will be repeated sequentially. The magnetizing currents thus obtained are then fed to the exciting winding 6c for forming the corresponding spaced magnetic poles on the erasing head member 9 surface. Incidentally, the shift-register 34 starts its shift-operation in response to a start signal issued from a start signal circuit 38.

An example of the waveforms of the magnetizing currents produced by the FIG. 11 apparatus is shown in FIG. 12. In the figure, sequential number of the magnetizing current setting circuits (replaceable by the scale of the pulley 25) is plotted on the abscissa and the amplitudes and polarities of the magnetizing pulse currents on the ordinate.

The gradual reduction of the adjacent poles distances on the erasing head member may be realized by changing the pitch of the scale 28 or changing the rotational speed of the pulley 25. The scale 28 may be obtained by sticking a tape with the graduations printed thereon onto the peripheral surface of the pulley 25. The our experiment shows that 30 to 40 magnetic poles can easily be formed on a barium ferrite head member with 5 mm length and only about one second is taken for magnetization.

A fourth embodiment of the erasing head manufacturing apparatus according to the present invention will be given referring to FIG. 13. In this example, an AC bias current 41 is superposed on the output signal of the magnetizing current supply circuit 7 by using an AC bias source 40 additionally used. FIG. 14 shows the relation between the magnetic field intensity of the magnetic pole and the magnetizing current. In the figure, the relation when the bias source 40 is used is plotted by a curve 43. When no bias source is used, the relation is represented by a curve 42. When the characteristic curve is non-linear as the curve 42, it is very difficult to control the amplitudes of the magnetizing current so as to obtain desired values of the magnetic pole electric field intensities. However, if the linear characteristic curve 43 is used, a desired distribution of the magnetic field on the erasing head surface may easily be obtained. When the rotational speed of the erasing head member is relatively slow, AC current with the commercial frequency (50 Hz or 60 Hz) may be used for the bias current 41. It was ascertained that, when the AC bias current was superposed on the magnetizing current from the circuit 7, the distance between adjacent magnetic poles of the same polarity was several tens microns. Assume that the magnetic poles are equally distanced with the distance of 50 microns and the length of the erasing head is 3 mm. In this case, 60 magnetic poles may be formed on the erasing head surface.

As seen from the foregoing description, according to the present invention, a large number of magnetic poles may be formed on the erasing head surface and the adjacent poles distances may be changed little by little. Therefore, the erasing magnetic field applied to the magnetic tape may be minutely changed so that the erasing characteristic is obtained which is approximate to that of the conventional AC erasing method. The erasing head of the present invention is applicable to the information erasing on the recording medium, in addition to the magnetic tape. The erasing head may be manufactured by gradually increasing the adjacent poles distances, unlike the above-mentioned embodiments. It should be noted, however, that such the method is also involved in the present invention.

What is claimed is:

1. A method for manufacturing a multipolar erasing head comprising the steps of:
    moving a multipolar erasing head member of which the surface to be magnetized is disposed in one of a state slidably contacted with, and a state very slightly spaced from, an electromagent having a gap, the front of which is passed by said erasing head member surface;
    supplying to an exciting winding of said electromagnet pulse currents of which the polarities are periodically reversed during said movement; and
    controlling either one of the speed of said relative movement of said erasing head member and the period of the polarity reversing of said pulse current so as to successively change in a given direction the distances between adjacent magnetic poles of the same polarity formed on the surface of said erasing head member.

2. The manufacturing method according to claim 1, in which bias current with a given amplitude is superposed on said pulse current.

3. The manufacturing method according to claim 1, in which the amplitude of said pulse current is successively changed during said movement of said erasing head member.

4. The manufacturing method according to claim 1, in which said distances are successively changed by successively changing said relative movement speed of said erasing head member.

5. The manufacturing method according to claim 1, in which said distances are successively changed by successively changing the polarity inversing period of said pulse current.

6. The manufacturing method according to claim 4, in which the rate of the successive change of said relative movement is constant during said movement.

7. The manufacturing method according to claim 4, in which the rate of the successive change of said relative movement of said erasing head member during at least selected one of periods of movement of said erasing head is smaller than those during the remaining periods.

8. The manufacturing method according to claim 1, in which a plurality of successive changes of said relative movement are repeated during said relative movement of said erasing head member.

9. A manufacturing method of a multipolar erasing head comprising the steps of:
    moving a multipolar erasing head member of which the surface to be magnetized is disposed in one of a state slidably in contact with, and a state very slightly spaced apart from an electromagnet having a gap, the front of which is passed by said erasing head member surface;
    detecting the time that a specified position to be magnetized on the surface of said erasing head member passes the front of said gap during said relative movement and producing a control signal in synchronism with said time; and
    supplying to an exciting winding wound around said electromagnet pulse current with polarities and amplitudes corresponding to said controlling signal, said pulse current being supplied from a magnetizing current supply circuit in response to said control signal applied thereto.

* * * * *